United States Patent
Jacob et al.

(10) Patent No.: US 10,454,101 B2
(45) Date of Patent: Oct. 22, 2019

(54) COMPOSITE ANODE MATERIAL MADE OF CORE-SHELL PARTICLES

(71) Applicant: Storedot Ltd., Herzeliya (IL)

(72) Inventors: David Jacob, Kfar Yehoshua (IL); Sergey Remizov, Petach Tikva (IL); Nitzan Shadmi, Tel-Aviv (IL); Hani Farran, Givataim (IL); Daniel Aronov, Netanya (IL)

(73) Assignee: Storedot Ltd., Herzeliya (IL)

( * ) Notice: Subject to any disclaimer, the term of this patent is extended or adjusted under 35 U.S.C. 154(b) by 0 days.

(21) Appl. No.: 15/414,655

(22) Filed: Jan. 25, 2017

(65) Prior Publication Data

US 2018/0212236 A1    Jul. 26, 2018

(51) Int. Cl.
*H01M 4/131*    (2010.01)
*H01M 4/36*    (2006.01)
(Continued)

(52) U.S. Cl.
CPC ........... *H01M 4/366* (2013.01); *H01M 4/386* (2013.01); *H01M 4/387* (2013.01); *H01M 4/485* (2013.01);
(Continued)

(58) Field of Classification Search
CPC .. H01M 4/366; H01M 10/0525; H01M 4/387; H01M 4/485; H01M 4/386; H01M 4/602; H01M 4/625; H01M 2004/027
See application file for complete search history.

(56) References Cited

U.S. PATENT DOCUMENTS

| | | | |
|---|---|---|---|
| 3,778,254 A | 12/1973 | Cole et al. | |
| 6,051,340 A | 4/2000 | Kawakami et al. | |

(Continued)

FOREIGN PATENT DOCUMENTS

| | | |
|---|---|---|
| CA | 2161076 | 4/1996 |
| CA | 2258026 | 12/1997 |

(Continued)

OTHER PUBLICATIONS

U.S. Appl. No. 62/371,874, filed Aug. 8, 2016, Burshtain.
(Continued)

*Primary Examiner* — Cynthia K Walls
(74) *Attorney, Agent, or Firm* — Pearl Cohen Zedek Latzer Baratz LLP

(57) ABSTRACT

Core-shell particles, composite anode material, anodes made therefrom, lithium ion cells and methods are provided, which enable production of fast charging lithium ion batteries. The composite anode material has core-shell particles which are configured to receive and release lithium ions at their cores and to have shells that are configured to allow for core expansion upon lithiation. The cores of the core-shell particles are connected to the respective shells by conductive material such as carbon fibers, which may form a network throughout the anode material and possibly interconnect cores of many core-shell particles to enhance the electrical conductivity of the anode. Ionic conductive material and possibly mechanical elements may be incorporated in the core-shell particles to enhance ionic conductivity and mechanical robustness toward expansion and contraction of the cores during lithiation and de-lithiation.

9 Claims, 5 Drawing Sheets

(51) Int. Cl.
*H01M 4/60* (2006.01)
*H01M 4/38* (2006.01)
*H01M 4/485* (2010.01)
*H01M 4/62* (2006.01)
*H01M 10/0525* (2010.01)
*H01M 4/02* (2006.01)

(52) U.S. Cl.
CPC ............ *H01M 4/602* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 6,492,061 B1 | 12/2002 | Gauthier et al. |
| 6,541,156 B1 | 4/2003 | Fuse et al. |
| 6,558,438 B1 | 5/2003 | Satoh et al. |
| 6,599,662 B1 | 7/2003 | Chiang et al. |
| 7,192,673 B1 | 3/2007 | Ikeda et al. |
| 7,906,238 B2 | 3/2011 | Le |
| 8,021,791 B1 | 9/2011 | Plichta et al. |
| 8,945,774 B2 | 2/2015 | Coowar et al. |
| 8,951,673 B2 | 2/2015 | Wessells et al. |
| 9,406,927 B1 | 8/2016 | Burshtain et al. |
| 9,472,804 B2 | 10/2016 | Burshtain et al. |
| 9,583,761 B2 | 2/2017 | Burshtain et al. |
| 9,728,776 B2 | 8/2017 | Burshtain et al. |
| 9,871,247 B2 | 1/2018 | Burshtain et al. |
| 10,199,677 B2 | 2/2019 | Drach et al. |
| 2002/0122980 A1 | 9/2002 | Fleischer et al. |
| 2002/0146623 A1 | 10/2002 | Suzuki et al. |
| 2003/0039889 A1 | 2/2003 | Park et al. |
| 2004/0033360 A1 | 2/2004 | Armand et al. |
| 2004/0219428 A1 | 11/2004 | Nagayama |
| 2005/0019659 A1 | 1/2005 | Shiozaki et al. |
| 2005/0093512 A1 | 5/2005 | Mader et al. |
| 2007/0003837 A1 | 1/2007 | Nishimura et al. |
| 2007/0281216 A1 | 12/2007 | Petrat et al. |
| 2007/0284159 A1 | 12/2007 | Takami et al. |
| 2008/0248386 A1 | 10/2008 | Obrovac et al. |
| 2009/0111020 A1 | 4/2009 | Yamaguchi et al. |
| 2009/0179181 A1 | 7/2009 | Zhang et al. |
| 2009/0317637 A1 | 12/2009 | Luhrs et al. |
| 2010/0159331 A1 | 6/2010 | Lee et al. |
| 2010/0190059 A1 | 7/2010 | Graetz et al. |
| 2011/0257001 A1 | 10/2011 | Negishi |
| 2012/0045696 A1 | 2/2012 | Herle |
| 2012/0088155 A1 | 4/2012 | Yushin et al. |
| 2012/0164531 A1* | 6/2012 | Chen ................ H01M 4/133 429/217 |
| 2013/0040226 A1 | 2/2013 | Yamauchi et al. |
| 2013/0059174 A1 | 3/2013 | Zhamu |
| 2013/0071731 A1 | 3/2013 | Tokuda et al. |
| 2013/0224594 A1* | 8/2013 | Yushin ................ H01M 4/38 429/218.1 |
| 2013/0260285 A1 | 10/2013 | Yamauchi et al. |
| 2013/0266875 A1 | 10/2013 | Matsumoto et al. |
| 2013/0337314 A1 | 12/2013 | Essaki et al. |
| 2014/0004426 A1 | 1/2014 | Kerkau et al. |
| 2014/0113202 A1 | 4/2014 | Sun et al. |
| 2014/0127588 A1 | 5/2014 | Kato et al. |
| 2014/0242461 A1 | 8/2014 | Hwang et al. |
| 2014/0295267 A1 | 10/2014 | Wang |
| 2015/0017515 A1 | 1/2015 | Jeon et al. |
| 2015/0046110 A1 | 2/2015 | Joe et al. |
| 2015/0221977 A1 | 8/2015 | Hallac et al. |
| 2015/0367747 A1 | 12/2015 | Decker et al. |
| 2016/0036045 A1 | 2/2016 | Burshtain et al. |
| 2016/0064773 A1 | 3/2016 | Choi et al. |
| 2016/0104882 A1 | 4/2016 | Yushin et al. |
| 2016/0149220 A1 | 5/2016 | Uhm et al. |
| 2016/0264124 A1 | 9/2016 | Hotta |
| 2016/0372753 A1 | 12/2016 | Fukasawa et al. |
| 2017/0012279 A1 | 1/2017 | Burshtain et al. |
| 2017/0207451 A1 | 7/2017 | Burshtain et al. |
| 2017/0288232 A1 | 10/2017 | Herle |
| 2017/0288271 A1 | 10/2017 | Le |
| 2017/0294643 A1 | 10/2017 | Burshtain et al. |
| 2017/0294644 A1 | 10/2017 | Burshtain et al. |
| 2017/0294648 A1 | 10/2017 | Burshtain et al. |
| 2017/0294649 A1 | 10/2017 | Burshtain et al. |
| 2017/0294680 A1 | 10/2017 | Burshtain et al. |
| 2017/0294681 A1 | 10/2017 | Burshtain et al. |
| 2017/0294687 A1 | 10/2017 | Burshtain et al. |
| 2018/0050602 A1 | 2/2018 | Aronov |
| 2018/0108937 A1 | 4/2018 | Drach et al. |
| 2018/0175634 A1 | 6/2018 | Aronov |
| 2018/0301757 A1 | 10/2018 | Burshtain et al. |

FOREIGN PATENT DOCUMENTS

| | | |
|---|---|---|
| CN | 101734675 | 6/2010 |
| CN | 104577081 | 4/2015 |
| EP | 2889097 | 7/2015 |
| JP | 2002/056891 | 2/2002 |
| JP | 2002/087807 | 3/2002 |
| JP | 2006/216276 | 8/2006 |
| JP | 2007/323837 | 12/2007 |
| JP | 2008053092 | 3/2008 |
| JP | 2012/131674 | 7/2012 |
| JP | 2012-131674 A | 7/2012 |
| JP | 2014-002834 | 1/2014 |
| KR | 2012/0121265 | 11/2012 |
| TW | 200616268 | 5/2006 |
| WO | WO 2007/111895 | 10/2007 |
| WO | WO 2013/040356 | 3/2013 |
| WO | WO 2014/068036 | 5/2014 |
| WO | WO 2015/016563 | 7/2014 |
| WO | WO 2015/114640 | 8/2015 |
| WO | WO 2015/145521 | 10/2015 |
| WO | WO 2016/031082 | 3/2016 |
| WO | WO 2018/109774 | 6/2018 |

OTHER PUBLICATIONS

U.S. Appl. No. 62/401,635, filed Sep. 29, 2016, Kedem et al.
U.S. Appl. No. 62/421,290, filed Nov. 13, 2016, Burshtain.
U.S. Appl. No. 62/426,625, filed Nov. 28, 2016, Burshtain et al.
U.S. Appl. No. 62/427,856, filed Nov. 30, 2016, Burshtain et al.
U.S. Appl. No. 62/319,341, filed Apr. 7, 2016, Burshtain.
U.S. Appl. No. 62/337,416, filed May 17, 2016, Burshtain.
U.S. Appl. No. 62/401,214, filed Sep. 22, 2016, Burshtain et al.
Chaudhuri et al. "Core/shell nanoparticles: classes, properties, synthesis mechanisms, characterization, and applications" Chemical Reviews, vol. 112, No. 4, pp. 2373-2433, 2012.
U.S. Appl. No. 15/678,143, filed Aug. 16, 2017, Aronov et al.
International Search Report of PCT Application No. PCT/IL2017/050424, dated Jul. 13, 2017.
Office action of U.S. Appl. No. 15/480,919, dated Jul. 5, 2017.
Office action of U.S. Appl. No. 15/447,889, dated Jul. 17, 2017.
Office action of U.S. Appl. No. 15/447,784, dated Jun. 22, 2017.
Office action of U.S. Appl. No. 15/414,655, dated May 9, 2017.
Jankovski et al. "New boron based salts for lithium-ion batteries using conjugated ligands", Physical Chemistry Chemical Physics, May 19, 2016, vol. 18, pp. 16274-16280.
Qi et al. "Lithium Concentration Dependent Elastic Properties of Battery Electrode Materials from First Principles Calculations", Journal of the Electrochemical Society, 2014, vol. 161, No. 11, pp. F3010-F3018.
Aurbach et al. "A short review of failure mechanisms of lithium metal and lithiated graphite anodes in liquid electrolyte solutions", Solid State Ionics, 2002, vol. 148, pp. 405-416.
Xu et al. "Reversible Conversion of Conducting Polymer Films from Superhydrophobic to Superhydrophilic", Angewandte Chemie, 2005, vol. 44, pp. 6009-6012.
Byeon "Multifunctional metal-polymer nanoagglomerates from singlepass aerosol self-assembly", Scientific Reports, Aug. 10, 2016, pp. 1-8.

(56) References Cited

OTHER PUBLICATIONS

Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Wen et al. "Thermodynamic and Mass Transport Properties of "LiAl"", Solid-State Science and Technology, Dec. 1979, vol. 126, No. 12, pp. 2258-2266.
Qi et al. "Threefold Increase in the Young's Modulus of Graphite Negative Electrode during Lithium Intercalation", Journal of the Electrochemical Society, 2010, vol. 157, No. 5, pp. A558-A566.
Son et al. "Silicon carbide-free graphene growth on silicon for lithium-ion battery with high volumetric energy density", Nature Communications, Jun. 25, 2015, vol. 6, No. 7393, pp. 1-8.
Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.
Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.
Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.
Guriparti et al. "Review on recent progress of nanostructured anode materials for Li-ion batteries", Journal of Power Sources, 2014, vol. 257, pp. 421-443.
Scott et al. "Ultrathin Coatings on Nano-LiCoO2 for Li-Ion Vehicular Applications", Nano Letters, 2011, vol. 11, pp. 414-418.
Cho et al. "Zero-Strain Intercalation Cathode for Rechargeable Li-Ion Cell", Angewandte Chemie, 2001, vol. 40, No. 18, pp. 3367-3369.
Ngo et al. "Mass-scalable synthesis of 3D porous germanium-carbon composite particles as an ultra-high rate anode for lithium ion batteries", Energy & Environmental Science, 2015, vol. 8, pp. 3577-3588.
Chen et al. "Conductive Rigid Skeleton Supported Silicon as High-Performance Li-Ion Battery Anodes", Nano Letters, 2012, vol. 12, pp. 4124-4130.
Kim et al. "Electrochemical properties of carbon-coated Si/B composite anode for lithium ion batteries", Journal of Power Sources, 2009, vol. 189, pp. 108-113.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of The Electrochemical Society, 1999, vol. 146, No. 3, pp. 857-861.
Doughty et al. "A General Discussion of Li Ion Battery Safety", The Electrochemical Society Interface, 2012, pp. 37-44.

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.
Liu et al. "A pomegranate-inspired nanoscale design for large-volume-change lithium battery anodes", Nature Nanotechnology, Mar. 2014, vol. 9, pp. 187-192.
Tao et al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
He et al. "Effect of solid electrolyte interface (SEI) film on cyclic performance of Li4Ti5O12 anodes for Li ion batteries", Journal of Power Sources, 2013, vol. 239, pp. 269-276.
Chung et al. "Electronically conductive phospho-olivines as lithium storage electrodes", nature materials, Oct. 22, 2002, vol. 1, pp. 123-128.
Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.
Wu et al. "Hydrogen Storage in Pillared Li-Dispersed Boron Carbide Nanotubes", J. Phys. Chem. C, 2008, vol. 112, No. 22, pp. 8458-8463.
Secrist "Compound Formation in the Systems Lithium-Carbon and Lithium-Boron", Journal of the American Ceramic Society, Oct. 1967, vol. 50, No. 10, pp. 520-523.
Suzuki et al. "Silicon nitride thin film electrode for lithium-ion batteries", Journal of Power Sources, 2013, vol. 231, pp. 186-189.
Cui et al. "Carbon-Silicon Core-Shell Nanowires as High Capacity Electrode for Lithium Ion Batteries", Nano Letters, May 8, 2009, vol. 9, No. 9, pp. 3370-3374.
Wang et al. "The dimensionality of Sn anodes in Li-ion batteries", materialstoday, Dec. 2012, vol. 15, No. 12, pp. 544-552.
Bhandavat et al. "Improved Electrochemical Capacity of Precursor-Derived Si(B)Cn-Carbon Nanotube Composite as Li-Ion Battery Anode", ACS Applied Materials & Interfaces, Oct. 2, 2012, vol. 4, pp. 5092-5097.
Hu et al. "Silicon/graphene based nanocomposite anode: large-scale production and stable high capacity for lithium ion batteries", Journal of Materials Chemistry A, 2014, vol. 2, No. 9118, pp. 9118-9125.
Konno et al. "Application of Si-C-O glass-like compounds as negative electrode materials for lithium hybrid capacitors", Journal of Power Sources, 2009, vol. 191, pp. 623-627.
Bhandavat et al. "Synthesis, Characterization, and High Temperature Stability of Si(B) Cn-Coated Carbon Nanotubes Using a Boron-Modified Poly(ureamethylvinyl)Silazane Chemistry", Journal of the American Ceramic Society, 2012, vol. 95, No. 5, pp. 1536-1543.
Nowotny et al. "Investigations in the three systems: Molybdenum-Silicon-boron, tungsten-Silicon-boron and in which System: VS12-TaSi2", MB. Chem., 1956, vol. 88, No. 2, pp. 179-182.
Yom et al. "Improved electrochemical behavior of Tungsten Coated Silicon Monoxide-Carbon composite anode in lithium ion battery", Abstract #1041, The Electrochemical Society 224th ECS Meeting, Oct. 27-Nov. 1, 2013.
Kasavajjula et al. "Nano- and bulk-silicon-based insertion anodes for lithium-ion secondary cells", Journal of Power Sources, 2007, Vo. 163, pp. 1003-1039.
Kennedy et al. "High-Performance Germanium Nanowire-Based Lithium-Ion Battery Anodes Extending over 1000 Cycles Through in Situ Formation of a Continuous Porous Network", Nano Letters, 2014, vol. 14, pp. 716-723.
Nitta et al. "High-Capacity Anode Materials for Lithium-Ion Batteries: Choice of Elements and Structures for Active Particles", Particle Systems Characterization, 2014, vol. 31, pp. 317-336.
Hwang et al. "Mesoporous Ge/GeO2/Carbon Lithium-Ion Battery Anodes with High Capacity and High Reversibility", ACS Nano, Apr. 13, 2015, vol. 9, No. 5, pp. 5299-5309.

(56) References Cited

OTHER PUBLICATIONS

Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.
Barton et al. "The Reduction of Germanium Dioxide With Graphite At High Temperatures", Journal of the Less-Common Metals, 1970, vol. 22, pp. 11-17.
Billaud et al. "Synthesis and electrical resistivity of lithium-pyrographite intercalation compounds (stages I, II and III)", Materials Research Bulletin, Jul. 1979, vol. 14, No. 7, pp. 857-864.
Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.
Final office action of U.S. Appl. No. 15/414,655, dated Aug. 14, 2017.
Office action of U.S. Appl. No. 14/926,012, dated Apr. 21, 2016.
Office action of U.S. Appl. No. 14/813,499, dated Mar. 10, 2017.
Office action of U.S. Appl. No. 15/480,888, dated Jul. 5, 2017.
Office action of U.S. Appl. No. 15/263,399, dated Nov. 14, 2016.
Final office action of U.S. Appl. No. 15/480,888, dated Sep. 13, 2017.
Final office action of U.S. Appl. No. 15/447,784, dated Oct. 19, 2017.
Office action of U.S. Appl. No. 15/582,066, dated Aug. 21, 2017.
U.S. Office Action for U.S. Appl. No. 15/480,888, dated Oct. 1, 2018.
U.S. Appl. No. 16/243,190, filed Jan. 9, 2019, Kuks et al.
Office Action for U.S. Appl. No. 16/254,644, dated Mar. 1, 2019.
Notice of Allowance for U.S. Appl. No. 16/258,728, dated Mar. 6, 2019.
Office Action for U.S. Appl. No. 15/853,885, dated Jan. 10, 2019.
Notice of Allowance for U.S. Appl. No. 15/783,586, dated Jan. 25, 2019.
Office Action for CN Application No. 2015800456854, dated Mar. 22, 2019.
Office Action for U.S. Appl. No. 16/268,527, dated Apr. 2, 2019.
U.S. Appl. No. 15/935,006, filed Mar. 25, 2018, Aronov.
U.S. Appl. No. 15/792,779, filed Oct. 25, 2017, Jacob et al.
U.S. Appl. No. 15/853,885, filed Dec. 25, 2017, Jacob et al.
Aldrich (Sigma-Aldrich MSDS Lithium hexafluorophosphate {http://www.sigmaaldrich.com/MSDS/MSDS/DisplayMSDSPage.do?country=US&language=en&pro ductNumber=450227&brand=ALDRICH} Printed Dec. 19, 2017).
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF} date Nov. 4, 2014).
U.S. Office Action for U.S. Appl. No. 15/447,784, dated Dec. 28, 2017.
U.S. Office Action for U.S. Appl. No. 15/844,689, dated Jan. 31, 2018.
U.S. Office Action for U.S. Appl. No. 15/853,885, dated Feb. 23, 2018.
Lewandowski et al. "Ionic liquids as electrolytes for Li-ion batteries—An overview of electrochemical studies", Journal of Power Sources, vol. 194, 2009, pp. 601-609.
Buzzeo et al. "Non-Haloaluminate Room-Temperature Ionic Liquids in Electrochemistry—A Review", ChemPhysChem, 2004, vol. 5, pp. 1106-1120.
Moreno et al. "Ionic Liquid Electrolytes for Safer Lithium Batteries", Journal of the Electrochemical Society, vol. 164, No. 1, 2017, pp. A6026-A6031.
U.S. Office Action for U.S. Appl. No. 15/783,586, dated Apr. 6, 2018.
European Search Report for Application No. EP17206661.5, dated Apr. 16, 2018.
U.S. Office Action for U.S. Appl. No. 15/447,889, dated May 24, 2018.
U.S. Office Action for U.S. Appl. No. 15/480,904, dated Oct. 29, 2018.
U.S. Office Action for U.S. Appl. No. 15/480,911, dated Nov. 8, 2018.
U.S. Office Action for U.S. Appl. No. 15/480,922, dated Nov. 8, 2018.
Office Action for U.S. Appl. No. 15/853,885, dated May 1, 2019.
Office Action for U.S. Appl. No. 16/013,969, dated May 22, 2019.
Office Action for U.S. Appl. No. 16/243,190, dated Jun. 12, 2019.
Lewandowski et al. "Ionic liquids as electrolytes for Li-ion batteries—An overview of electrochemical studies" Journal of Power Sources vol. 194, Issue 2, Dec. 1, 2009, pp. 601-609.
Extended European Search Report for EP Application No. EP17778800.7, dated Aug. 12, 2019.

* cited by examiner

COMPOSITE ANODE MATERIAL MADE OF CORE-SHELL PARTICLES

BACKGROUND OF THE INVENTION

1. Technical Field

The present invention relates to the field of lithium ion batteries, and more particularly, to anodes thereof.

2. Discussion of Related Art

With continued success in the portable electronic device market, Li-ion batteries (LIBs) are of increasing interest for applications in electric and hybrid vehicles, surgical tools, and oil and gas drilling, etc., due to their superior energy density and long cycle life. However, current LIBs employ conventional graphite anodes which are limited in their capacity and their ability to support fast charging.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides composite anode material comprising core-shell particles which are configured to receive and release lithium ions at their cores and having shells that are configured to allow for core expansion upon lithiation, and electronic conductive material which interconnects the cores of the core-shell particles.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
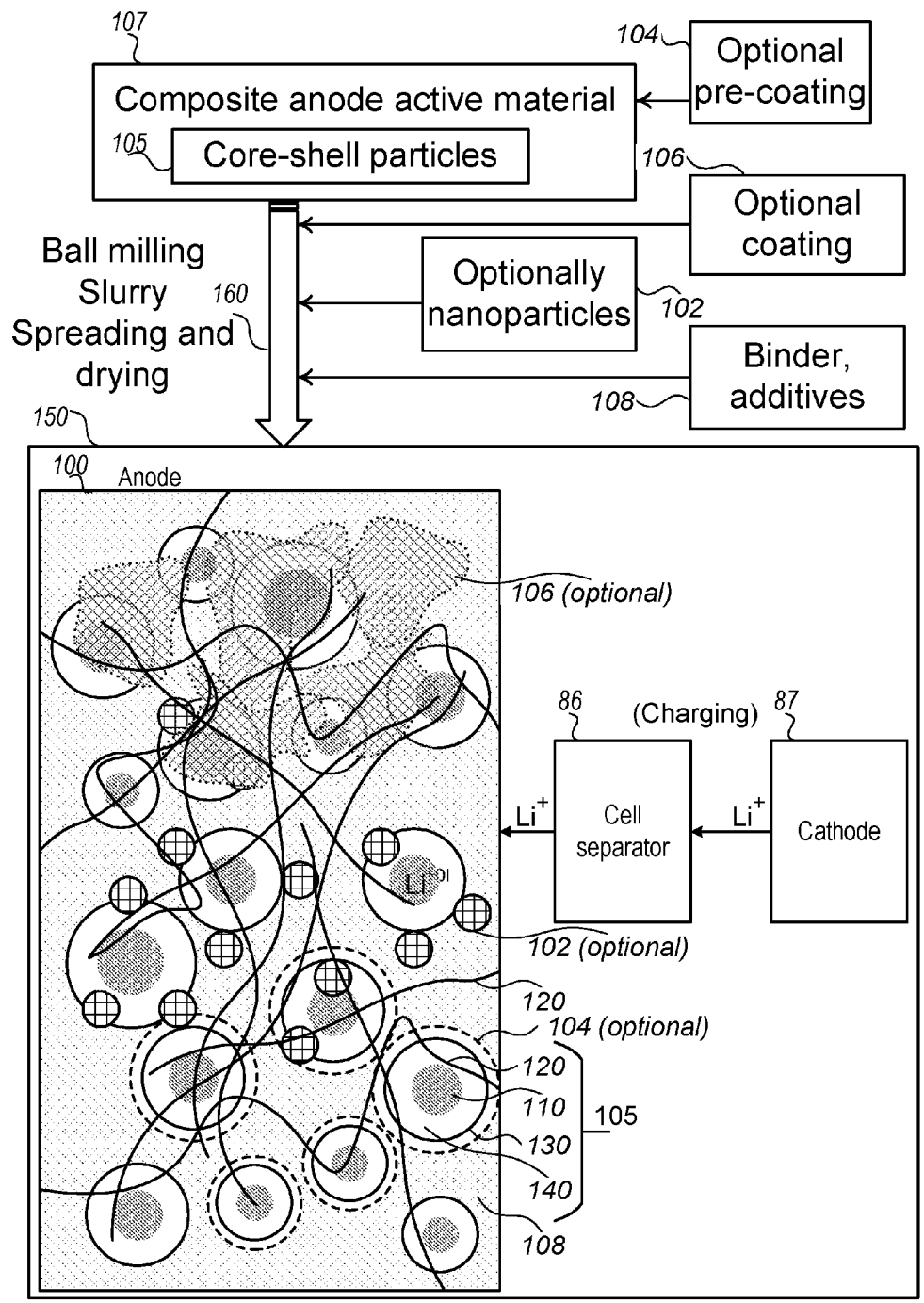
FIG. 1 is a high level schematic illustration of various anode components in a preparation process, and various anode configurations in a lithium ion cell, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Chaudhuri and Paria 2012 (Core/Shell Nanoparticles: Classes, Properties, Synthesis Mechanisms, Characterization, and Applications, Chem. Rev. 2012, 112, 2373-2433) demonstrate core shell particles having a core (inner material) and a shell (outer layer material), which are used in various applications, and are made of a wide variety of material combinations.

In the following, core-shell particles, composite anode material, anodes made therefrom, lithium ion cells and methods are provided, which enable production of fast charging lithium ion batteries. The composite anode material has core-shell particles which are configured to receive and release lithium ions at their cores and to have shells that are configured to allow for core expansion upon lithiation. The cores of the core-shell particles may be in direct contact with the respective shells and/or be connected by conductive material such as carbon fibers to the respective shells. The composite anode material comprises carbon fibers which may form a network throughout the anode material and possibly interconnect cores of many core-shell particles to enhance the electrical conductivity of the anode. Ionic conductive material and possibly mechanical elements may be incorporated in the core-shell particles to enhance ionic conductivity and mechanical robustness toward expansion and contraction of the cores during lithiation and de-lithiation. Ionic conductive brittle materials may be embedded in flexible electrical conductive material to form the shells around metalloid cores (or cores made of other materials, listed below) and maintain contact with the cores during expansion and contraction.

FIG. 1 is a high level schematic illustration of various anode components in a preparation process 160, and various anode configurations in a lithium ion cell 150, according to some embodiments of the invention. FIG. 1 illustrates schematically, in a non-limiting manner, a surface of an anode 100, which may comprise anode active material particles 105 (e.g., core-shell particles 105 with cores 110 being particles of metalloids such as silicon, germanium and/or tin, and/or of aluminum, or cores made of other materials, listed below) at different sizes (e.g., in the order of magnitude of 100 nm, and/or possible in the order of magnitude of 10 nm or 1 µm), binder(s) (for binding particles 105 in the anode material to each other and to the current collector, not shown) and additive(s) 108 as well as optional coatings 106 (e.g., conductive polymers, lithium polymers, etc.). Active material particles 110 may be pre-coated 104 (e.g., by conductive polymers, lithium polymers, etc.) and/or various nanoparticles (e.g., $B_4C$, $B_2O_3$, $P_2O_5$) 102, may be attached thereto in preparation processes 160 such as ball milling (see, e.g., U.S. Pat. No. 9,406,927, which is incorporated herein by reference in its entirety), slurry formation, spreading of the slurry and drying the spread slurry. Details for some of these possible configurations are disclosed in the patent documents which were listed herein. The different configurations are illustrated schematically in different regions of the anode surface, yet embodiments may comprise any combinations of these configurations as well as any extent of anode surface with any of the disclosed configurations. In the illustrated configuration, conductive fibers 120 are shown to extend throughout anode 100, interconnect cores 110 and interconnect among themselves. Electronic conductivity may be enhanced by any of the following: binder and additives 108, coatings 106, nanoparticles 102 and pre-coatings 104, which may be in contact with an electronic conductive material (e.g., fibers) 120. Lithium ion cell 150 comprises anode 100 (in any of its configurations disclosed herein) comprising anode material 107 with core-shell particles 105, an electrolyte (not shown) and at least a cathode 87 delivering lithium ions during charging through a cell separator 86 to anode 100. Lithium ions ($Li^+$) are lithiated (to $Li^{-01}$, indicating substantially non-charged lithium, in lithiation state) when penetrating the anode material 107, e.g., into cores 110 of core-shell particles 105. Any of the configurations of composite anode material 107 and core-shell particles 105 presented below may be used in anode 100, as particles 105 are illustrated in a generic, non-limiting way.

Figure 2:
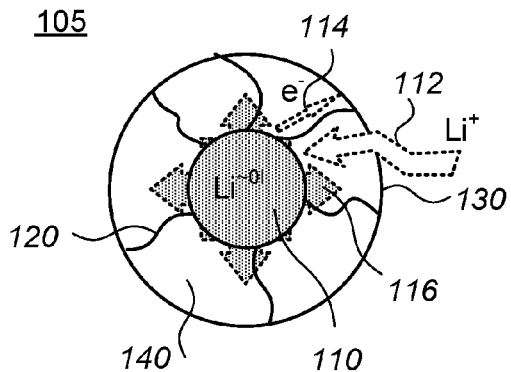
FIG. 2 is a high level schematic illustration of a core-shell particle, according to some embodiments of the invention.

FIG. 2 is a high level schematic illustration of a core-shell particle 105, according to some embodiments of the invention. Core-shell particle 105 comprises at least one core 110 and shell 130 which may be in direct contact and/or may be connected by electronic conductive material 120 such as conductive fibers 120 (as a non-limiting example). One or more cores 110 are configured to receive and release lithium ions ($Li^+$) in the charging and discharging process, respectively, and shell 130 is configured to allow for, or accommodate core expansion 116 upon lithiation in core 110. Core(s) 110 may be separated from shell(s) 130 by gap(s) 140 which may be voids, gaseous or at least partly filled with compressible material such as a polymer material or other mechanically compliant material. In some embodiments, core(s) 110 may be in direct contact with respective shell(s) 130, in some of the lithiation states of core(s) 110 and/or in some of core-shell particle 105 in anode 100. Shell 130 is further configured to enable and/or facilitate movement of lithium ions (indicated schematically in a non-limiting manner by arrow 112) to core(s) 110, e.g., have high ionic conductivity, while conductive fibers 120 are configured to conduct electrons (indicated schematically in a non-limiting manner by arrow 114) from core(s) 110 to shell 130, e.g., have high electronic conductivity. It is noted that arrows 112, 114 denote lithium ion and electron movement during charging of the respective lithium cell. Electronic conductive material 120 (such as conductive fibers 120) may be configured to form a network throughout anode material 107 (non-limiting examples for networks are illustrated in FIGS. 1, 2, 4 and 7) and possibly interconnect cores 110 of many core-shell particles 105 to provide conduction pathways between particles 105 and enhance the electrical conductivity of anode 100.

In certain embodiments, shell 130 may be made of an ionic conductive material having a high ionic conductivity only, without electron conductivity, e.g., from an insulating material, while the electronic conductivity is provided by electronic conductive material 120 (such as conductive fibers 120, e.g., carbon fibers or carbon nanotubes). Such configurations may vastly improve upon prior art technology which would have required shell material and structure to possess high conductivity for both electrons and ions. The disclosed ability to provide the electronic conductivity by electronic conductive material 120 opens up a large variety of ionic conductors, including insulators, to be used as shell material for shells 130. Thus, in certain embodiments, shells 130 are made of ionic conductors which are electronic insulators.

Figure 3:
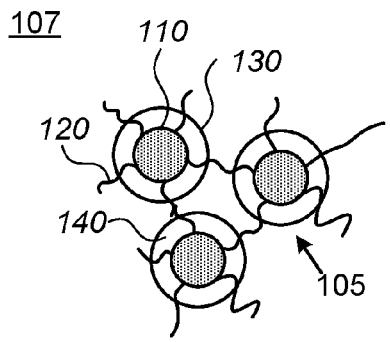
FIGS. 3 and 4 are high level schematic illustrations of composite anode material comprising a plurality of core-shell particles, according to some embodiments of the invention.
Figure 4:
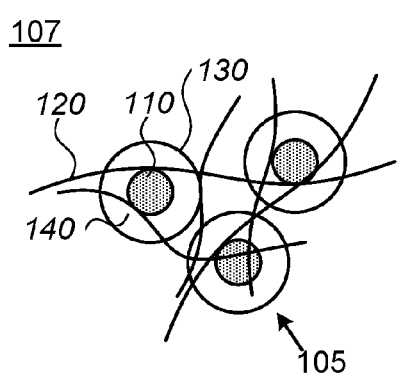

FIGS. 3 and 4 are high level schematic illustrations of composite anode material 107 comprising a plurality of core-shell particles 105, according to some embodiments of the invention. As illustrated schematically in FIG. 3, particles 105 and/or cores 110 may be interconnected by conductive fibers 120, which may extend beyond shells 130. As illustrated schematically in FIG. 4, conductive fibers 120 may extend over a plurality of core-shell particles 105, interconnecting their cores 110 along long distances of multiple particles 105.

For example, cores 110 may be made of SnSi, shells 130 may be made of carbon and conductive fibers 120 may comprise carbon nanotubes, e.g., having diameters between 10-20 nm, and/or possible up to diameters in the order of magnitude of 100 nm and lengths between 3 µm and 100 µm, and/or possible down to lengths in the order of magnitude of 100 nm. For example, conductive fibers 120 may be grown in a chemical vapor deposition (CVD) process, e.g., using cores 110 as seeds.

Figure 5:
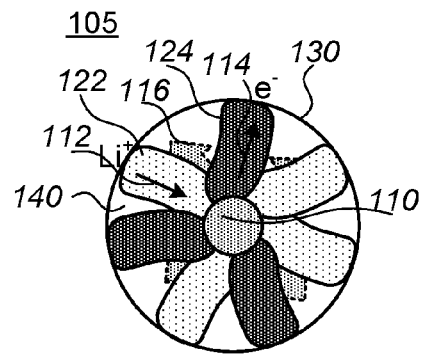
FIG. 5 is a high level schematic illustration of a core-shell particle, according to some embodiments of the invention.

FIG. 5 is a high level schematic illustration of a core-shell particle 105, according to some embodiments of the invention. In certain embodiments, core(s) 110 and shell 130 of core-shell particle 105 may be connected by ionic conductive material 122 (ionic conductivity indicated schematically by arrow 112), by electronic conductive material 124 (electronic conductivity indicated schematically by arrow 114, e.g., conductive fibers 120), with mechanical elements or material (and/or gaps(s)) 140 between core(s) 110 and shell 130 being empty or having compliant material which allows for and/or accommodates mechanical expansion of core(s) 110 (indicated schematically by arrow 116) upon lithiation into core(s) 110. It is noted that arrows 112, 114 denote lithium ion and electron movement during charging of the respective lithium cell.

Figure 6:
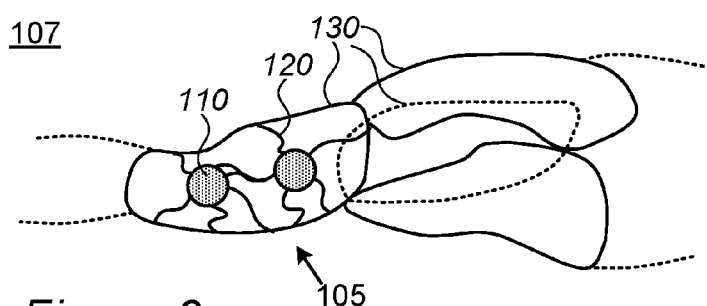
FIG. 6 is a high level schematic illustration of composite anode material comprising a plurality of core-shell particles, according to some embodiments of the invention.

FIG. 6 is a high level schematic illustration of composite anode material 107 comprising a plurality of core-shell particles 105, according to some embodiments of the invention. As illustrated schematically in FIG. 6, at least some of shells 130 may comprise multiple cores 110 which are interconnected by conductive fibers 120 and together form one or more layers of anode 100. Core-shell particles 105 may extend to regions of anode 100 having assemblies of interconnected cores 110 (interconnected by conductive fibers 120).

Figure 7:
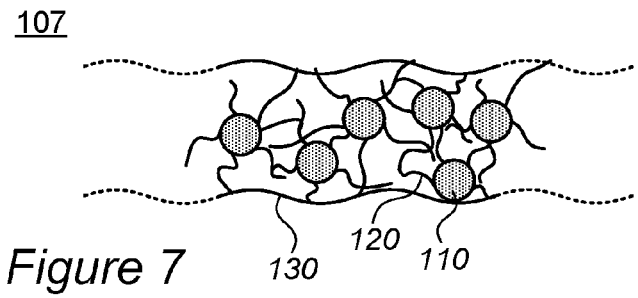
FIG. 7 is a high level schematic illustration of composite anode material, according to some embodiments of the invention.

FIG. 7 is a high level schematic illustration of composite anode material 107, according to some embodiments of the invention. Composite anode material 107 may comprise extended shell 130, possibly even single shell 130 per anode layer, having a large plurality of cores 110, interconnected among themselves and with shell 130 by conductive fibers 120.

In certain embodiments, shells 130 may comprise composite material, such as a brittle, ionic conductive component 132 embedded in a flexible, electronic conductive component 134, selected to accommodate swelling and contraction of core 110 upon lithiation and de-lithiation, respectively. For example, the shell material may be coated onto cores 110 prior to lithiation and expand with core lithiation (at least during over or a few formation cycles, after which shell 130 may remain expanded).

Figure 8:
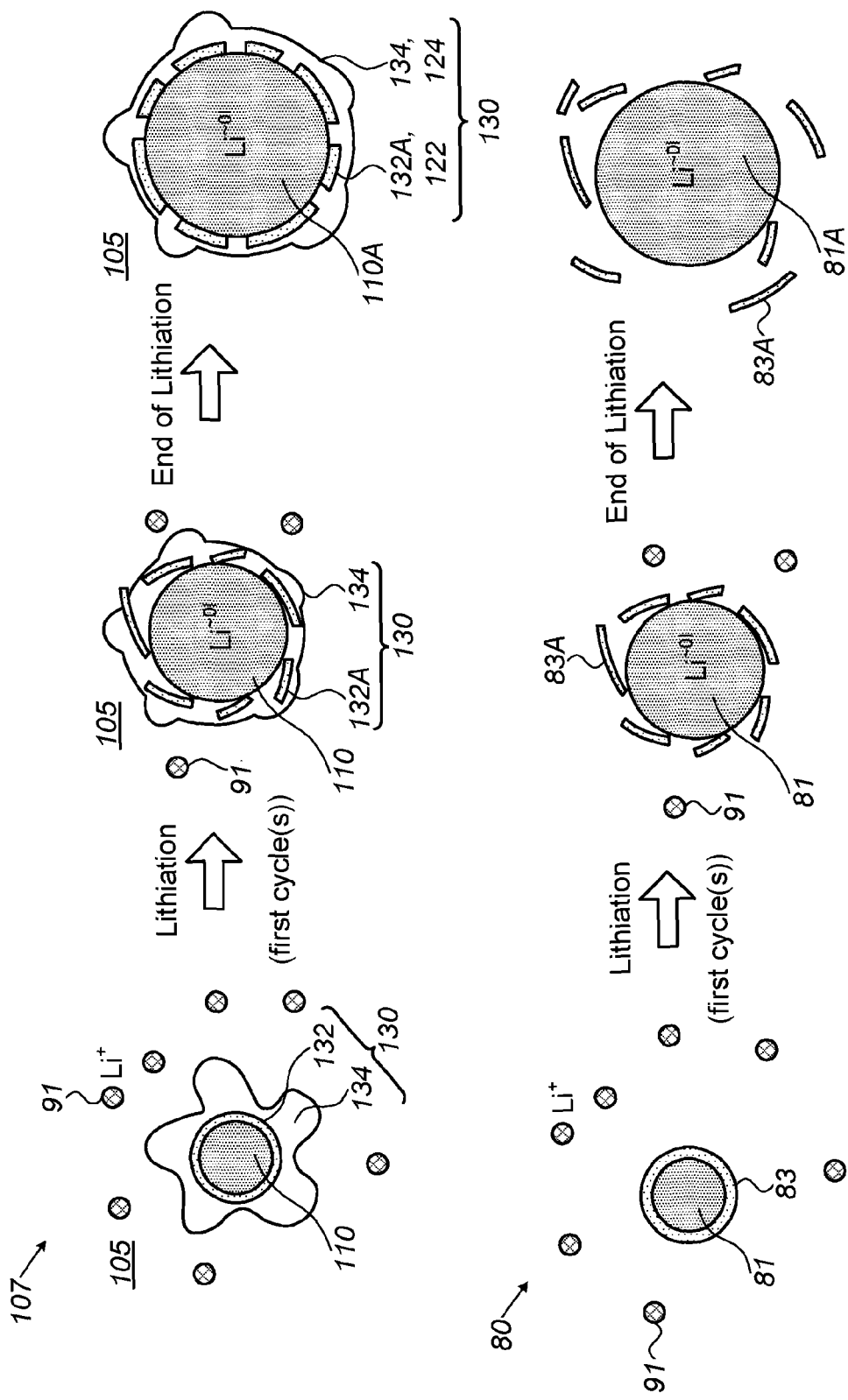
FIG. 8 is a high level schematic illustration of a core-shell particle with a composite shell in composite anode material and its advantages with respect to prior art 80, according to some embodiments of the invention.

FIG. 8 is a high level schematic illustration of core-shell particle 105 with composite shell 130 in composite anode material 107 and its advantages with respect to prior art 80, according to some embodiments of the invention.

As prior art brittle coating 83 of anode active material particles 81 cracks upon expansion of lithiated particles 81A due to the mechanical stain, active material particles 81 lose coatings 83A after the first charging cycles. In contrast, core-shell particle 105 with composite shells 130 made of brittle component 132 embedded in a flexible component 134—maintain cracked brittle coating 132A at the vicinity of lithiated cores 110A within flexible component 134 of shell 130. Moreover, brittle component 132A is retained at the vicinity of cores 110 during further cycles by flexible component 134, and may at least partially adhere to cores 110.

Finally, brittle component 132 may be selected to be a good ionic conductor and thereby function as ionic conductive material 122 to provide ion paths or gates among core-shell particle 105 in anode 100, while flexible component may be selected to be a good electronic conductor and thereby function as electronic conductive material 124 described above (see FIG. 5). For example, lithium titanate oxide—LTO may be used as ionic conductive brittle component 132 and polyaniline may be used as electronic conducting flexible component 134, as exemplified below, forming conducting elastic shell 130 with high electrical and ionic conductivity encapsulating metalloid particles 110 to form core-shell particles 105 for composite anode material 107. Flexible component 134 may be reenforced with conductive fibers 120, at least some of which contacting core 110.

In any of the disclosed embodiments, electronic conductive material (and/or fibers) 120 may extend to the surface of anode 100. Electronic conductive material 120 may comprise electronic conductive fibers and/or non-fibrous electronic conductive material.

Cores 110 may comprise metalloid material or possibly aluminum, such as disclosed in any of U.S. Pat. No. 9,472,804, U.S. application Ser. Nos. 14/813,499, 15/015,765 and/or in any of U.S. Provisional Applications Nos. 62/319,341, 62/337,416, 62/401,214, 62/421,290 and 62/427,856, which are incorporated herein by reference in their entirety.

Cores 110 may comprise alloy-type materials such as any of single elements Sn, Si, Ge, Pb, P, Sb, Bi, Al, Ga, Zn, Ag, Mg, As, In, Cd and Au, and/or mixtures and/or alloys of these elements. In some embodiments, cores 110 may comprise any of the above materials, mixed with carbon matrix.

Various pre-coatings and coatings may be applied to core-shell particles 105, composite anode material 107 and/or anode 100, e.g., at least partially filling gaps 140, coating shells 130 and/or coating regions of anode 100. For example, various pre-coatings and coatings which are disclosed in any of U.S. Provisional Applications Nos. 62/371,874, 62/401,635, 62/421,290, 62/426,625 and 62/427,856 may be incorporated herein by reference in their entirety. Carbon-based material may be configured to form a coating around cores 110 and/or cores 110 may be embedded in carbon matrix forming a composite structure. For example, carbon coatings may be applied in a thickness range of 5 nm to 5 μm thickness, in a concentration range of 5% to 95% of anode 100, and possibly be made of soft carbon, hard carbon and/or graphitic carbon. In certain embodiments, pre-coatings and/or coatings materials may be configured to provide at least part of the shell material of shells 130.

Conductive fibers 120 may comprise carbon-based material, such as specifically designed fibers e.g., carbon fibers and/or carbon nanotubes, and/or carbon-based coating material which is modified into conductive fibers 120 during preparation of anode 100. For example, conductive fibers 120 may comprise any of nanofibers structures CNT (carbon nanotubes), carbon fibers and/or graphene nano-sheets/plates structures at an amount range of 0.0001%-15% with respect to the total anode material, possibly embedded, at least initially, in the carbon-based coating.

In certain embodiments, anode 100 may comprise weight ranges of 50-95% active material, at least partly as core-shell particles 105, 1-40% of conductive fibers 120 (e.g., as conductive agent material, possibly including coating material) and 1-40% of binder material.

Advantageously, disclosed core-shell particles 105 and composite anode material 107 enable use of metalloid particles (or cores made of other materials, listed above) as anode material, in spite of their lower electrical conductivity and larger mechanical expansion upon lithiation with respect to graphite as anode material, and thereby enable taking advantage of their remarkably high capacity. In particular, disclosed core-shell particles 105 and composite anode material 107 may be especially advantageous for fast charging lithium ion cells, to accommodate the mechanical stresses and maintain high electrical and ionic conductivities to metalloid cores 110 (or cores made of other materials, listed above).

In some embodiments, ionic conductive material 122 (FIG. 5) may be at least partly embodied in brittle component 132 embedded in a flexible component 134 (FIG. 8). For example, metalloid nanoparticles (as cores 110, or possibly cores made of other materials, listed above) may be coated by a $TiO_2$ precursor to form an amorphous $TiO_2$ and/or possibly be calcined or annealed to form $TiO_2$ coating on the metalloid nanoparticles, such as cores 110. The $TiO_2$ may then undergo lithiation with a lithium salt, followed by a second annealing (or calcination), e.g., in air or in an inert atmosphere, to form the lithium titanate oxide (LTO) coating 132, which has fast anodic kinetics. The particles may be coated again by elastic and electronic conducting shell 134 which may comprise a layered material and/or an organic polymer. When used as an electrode material in lithium ion batteries, metalloid cores 110 expand, breaking up LTO layer 132, fragments 132A of which becoming embedded in elastic shell 134. As metalloid particle cores 110 expand, their surface presses up against LTO fragments 132A embedded in elastic shell 134 to form an ionic conducting bridge (as ionic conductive material 122) to encapsulated metalloid particle cores 110, while elastic shell 134 maintains the electronic connection (as electronic conductive material 124) to cores 110. Advantageously, the suggested procedure composite anode material 107 with core-shell particle 105 that provide good ionic and electronic conductivity and is mechanically robust with respect to expansion and contraction due to lithiation and de-lithiation processes. It is noted that cores 110 may be metalloid and/or be made of other materials, listed above.

In a specific, non-limiting example, metalloid nanoparticles (as cores 110) were dispersed in ethanol solution. A metalorganic titanium precursor, e.g., titanium isopropoxide, was added as a precursor for $TiO_2$. The particles were coated in solution, using ammonium hydroxide as a catalyst. The product was calcined in air at 700° C. to form the $TiO_2$ coating. The particles were again dispersed in ethanol and $LiOH.2H_2O$ was added. The ethanol was evaporated and the particles were calcined again in air at 700° C. to form LTO-covered metalloid particles (having cores 110 and brittle component 132). The particles were dispersed in a mixture of acidic water and ethanol along with aniline, and then an ammonium persulfate acidic solution was added. After polyaniline was formed a base was added until reaching pH=9. Particles 105 (having cores 110, brittle component 132 and the polyaniline as flexible component 134) were then dried and used to prepare a slurry which was coated on a current collector and used as an anode (see process 160 in FIG. 1).

In certain embodiments, with metalloid nanoparticles comprising Sn or any other material which may oxidize in the process disclosed above, $TiO_2$ coating may be carried out at room temperature by dispersing the nanoparticles (e.g., Si—Sn nanoparticles) in deionized water (DI) and adding them to a mixture of boric acid and $(NH_4)_2TiF_6$, which after stirring and cleaning in DI, may be followed by lithiation and optionally annealing in argon atmosphere to avoid oxidation.

Figure 9:
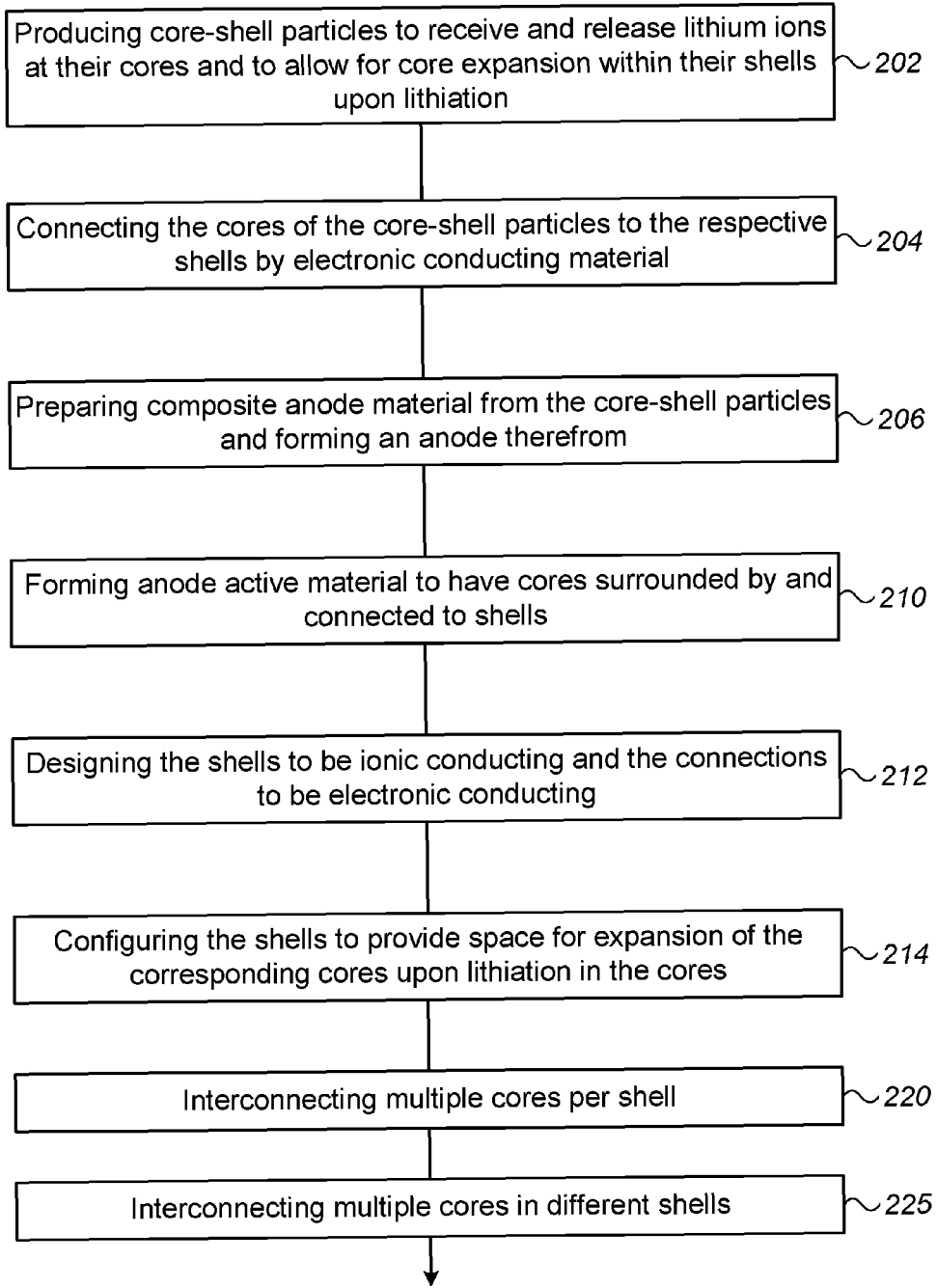
FIG. 9 is a high level flowchart illustrating a method, according to some embodiments of the invention.
Figure 9:
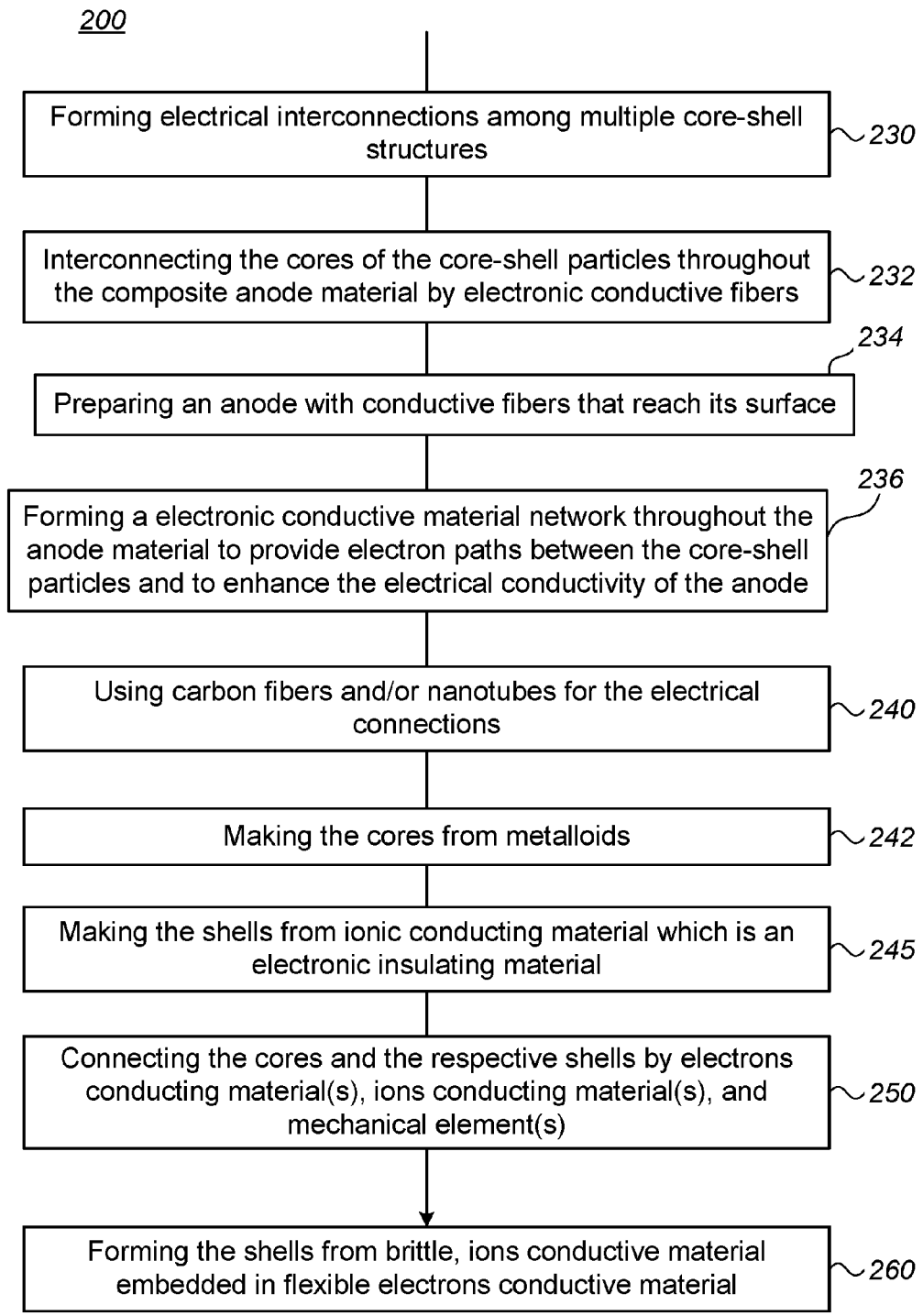

FIG. 9 is a high level flowchart illustrating a method 200, according to some embodiments of the invention. The method stages may be carried out with respect to anodes 100, composite anode material 107 and/or core-shell particles 105 described above. Method 200 may comprise stages for producing, preparing and/or using anodes 100, composite anode material 107 and/or core-shell particles 105, such as any of the following stages, irrespective of their order.

Method 200 comprises producing core-shell particles to receive and release lithium ions at their cores and to allow for core expansion within their shells upon lithiation (stage 202) and interconnecting multiple cores in different shells by electronic conductive material (stage 225). Method 200 may further comprise connecting the cores of the core-shell particles to the respective shells by electronic conductive material (stage 204). In some embodiments method 200 comprises making the shells of the core-shell particles from ionic conducting material which is an electronic insulating material (stage 245). Method 200 may further comprise preparing composite anode material from the core-shell particles and forming an anode therefrom (stage 206).

Method 200 may comprise forming anode active material to have cores surrounded by and connected to shells (stage 210), possibly designing the shells to be ionic conducting and the connections to be electronic conducting (stage 212) and configuring the shells to provide space for expansion of the corresponding cores upon lithiation in the cores (stage 214).

Method 200 may further comprise interconnecting multiple cores per shell (stage 220). Method 200 may further comprise forming electrical interconnections among multiple core-shell structures (stage 230).

Method 200 may further comprise interconnecting the cores of the core-shell particles throughout the composite anode material by conductive fibers (stage 232) and possibly preparing an anode with conductive fibers that reach its surface (stage 234).

Method 200 may comprise configuring the electronic conductive material (e.g., conductive fibers) to form a network throughout the anode material to provide electron paths between the core-shell particles and to enhance the electrical conductivity of the anode (stage 236).

In some embodiments method 200 may comprise using carbon fibers and/or nanotubes for the electronic connections (stage 240) and/or making the cores from metalloids (stage 242).

Method 200 may further comprise connecting the cores and the respective shells by electronic conducting material(s), ionic conducting material(s), and possibly mechanical element(s) that enable core expansion upon lithiation (stage 250). In some embodiments method 200 may comprise forming the shells from brittle, ionic conductive material embedded in flexible electronic conductive material (stage 260).

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. Composite anode material comprising:
   core-shell particles comprising cores configured to receive and release lithium ions and shells configured to allow for core expansion upon lithiation, and
   electrically conductive material which interconnects the cores of the core-shell particles,
   wherein the shells of the core-shell particles are made of LTO (lithium titanate oxide) embedded in a conductive polymer.

2. The composite anode material of claim 1, wherein at least some of the electrically conductive material reaches a surface of an anode made of the composite anode material.

3. The composite anode material of claim 1, wherein the core-shell particles further comprise ionic conductive material connecting the cores to the respective shells.

4. The composite anode material of claim 1, wherein the cores are made of at least one of: Sn, Si, Ge, Pb, P, Sb, Bi, Al, Ga, Zn, Ag, Mg, As, In, Cd and Au, and/or mixtures and/or alloys thereof.

5. The composite anode material of claim 1, wherein the shells further comprise a carbon coating.

6. An anode made of the composite anode material of claim 1.

7. The anode of claim 6, comprising in a range of 50-95 wt % of the core-shell particles, 1-40 wt % of the electrically conductive material and 1-40 wt % of binder material.

8. A lithium ion cell comprising the anode of claim 6.

9. A method of making an anode for a lithium ion cell comprising:
   providing composite anode material comprising core-shell particles configured to receive and release lithium ions at their cores and to allow for core expansion within their shells upon lithiation, and
   interconnecting the cores of the core-shell particles by electrically conductive material,
   wherein the shells of the core-shell particles are made of LTO (lithium titanate oxide) embedded in a conductive polymer.

* * * * *